(12) United States Patent
Stephens

(10) Patent No.: US 7,426,395 B2
(45) Date of Patent: Sep. 16, 2008

(54) TECHNIQUES TO SELECT DATA RATES FOR A WIRELESS SYSTEM

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 11/096,391

(22) Filed: Mar. 31, 2005

(65) Prior Publication Data

US 2006/0223442 A1    Oct. 5, 2006

(51) Int. Cl.
    *H04Q 7/20* (2006.01)
(52) U.S. Cl. .............. 455/452.2; 455/453; 455/456; 455/522; 370/252; 370/329
(58) Field of Classification Search ........ 455/452, 455/453, 522, 456, 455, 418, 419; 370/252, 370/329, 278
See application file for complete search history.

(56) References Cited

U.S. PATENT DOCUMENTS

| | | | |
|---|---|---|---|
| 6,889,041 B2 * | 5/2005 | Miyoshi et al. | 455/423 |
| 7,072,663 B2 * | 7/2006 | Ramos et al. | 455/453 |
| 7,079,494 B2 * | 7/2006 | Marinier et al. | 370/252 |
| 7,142,562 B2 * | 11/2006 | Yavuz et al. | 370/468 |
| 2003/0109261 A1 * | 6/2003 | Razavilar et al. | 455/452 |
| 2004/0001536 A1 * | 1/2004 | Lohtia et al. | 375/225 |
| 2006/0234660 A1 * | 10/2006 | Kwak | 455/226.3 |

* cited by examiner

*Primary Examiner*—Matthew Anderson
*Assistant Examiner*—Minh Dao
(74) *Attorney, Agent, or Firm*—Kacvinsky LLC

(57) ABSTRACT

A system, apparatus, method and article to select data rates for a wireless communication system are described. An apparatus may include a media access control processor to monitor interference levels for a receiver, estimate throughput values for each interference level, and select a data rate based on the throughput values. Other embodiments are described and claimed.

21 Claims, 4 Drawing Sheets

TECHNIQUES TO SELECT DATA RATES FOR A WIRELESS SYSTEM

BACKGROUND

In a wireless communication system, wireless communication devices may need to select a data rate for a wireless communication channel. The selected data rate and interference on the wireless channel may determine an amount of data communicated over the channel over a given period of time, sometimes referred to as throughput. Consequently, selecting the appropriate data rate for a given channel may significant impact throughput for a wireless device. Accordingly, techniques to improve such operations may therefore improve performance for a wireless communication device, and potentially overall system performance.

DETAILED DESCRIPTION

Figure 1:
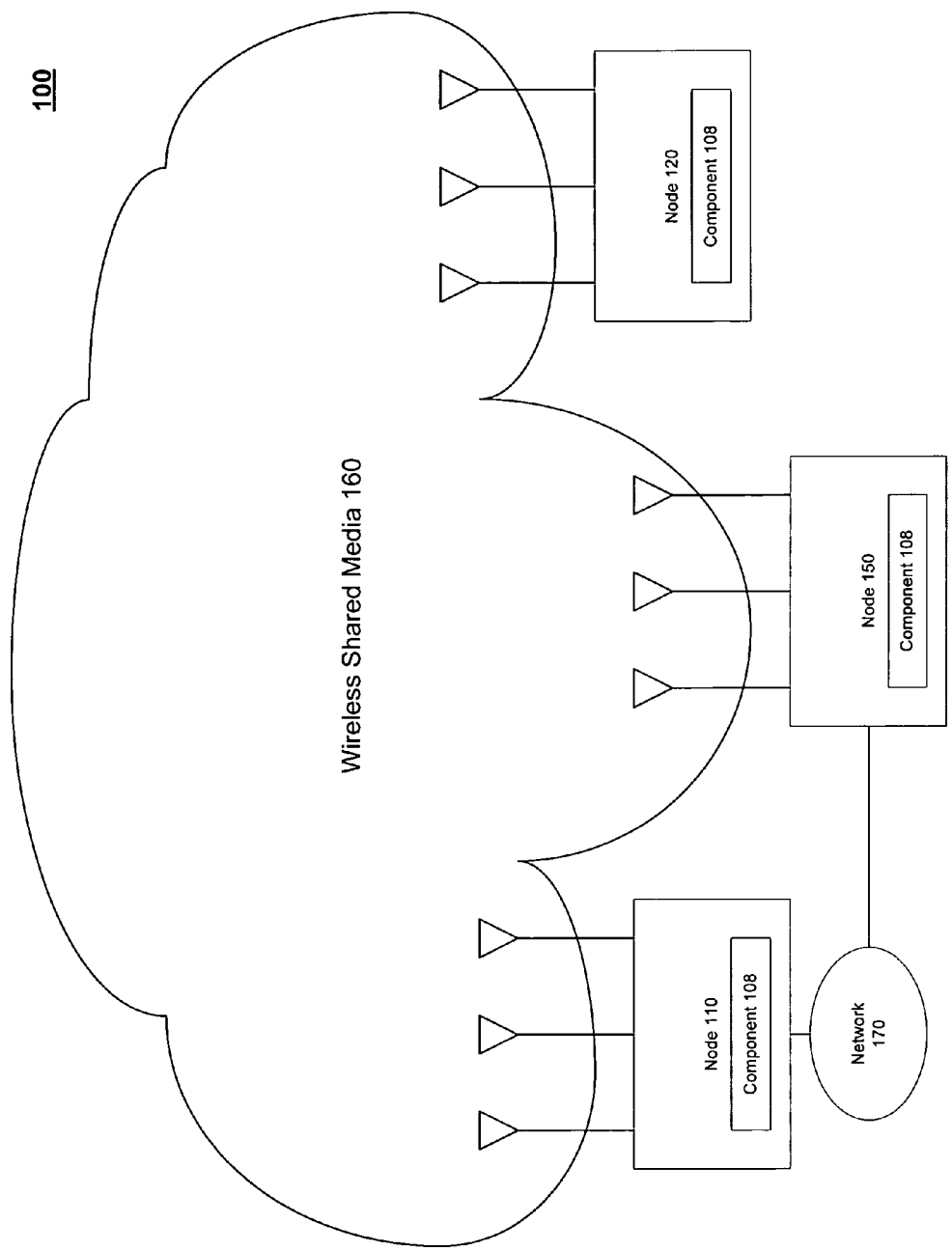
FIG. 1 illustrates one embodiment of a system.

FIG. 1 illustrates one embodiment of a system. FIG. 1 may illustrate a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, numerical information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with various wireless local area network (WLAN) protocols, such as the IEEE 802.11 series of protocols, including the IEEE 802.11a, 802.11b, 802.11g, 802.11h, 802.11n, and so forth. In another example, system 100 may operate in accordance with various wireless metropolitan area network (WMAN) mobile broadband wireless access (MBWA) protocols, such as a protocol from the IEEE 802.16 or 802.20 series of protocols. The embodiments are not limited in this context.

Referring again to FIG. 1, system 100 may comprise a wireless communication system. In one embodiment, system 100 may comprise a WLAN or WMAN system operating in accordance with the IEEE 802.11, 802.16 or 802.20 series of standard protocols. In one embodiment, for example, system 100 may comprise a WLAN system operating with a number of high throughput (HT) wireless devices arranged to operate in accordance with one or more of the IEEE-802.11n proposed standards. The embodiments are not limited in this context.

In one embodiment, system 100 may include one or more wireless communication devices, such as nodes 110, 120, 150. Nodes 110, 120, 150 may all be arranged to communicate information signals using one or more wireless transmitters/receivers ("transceivers") or radios, such as IEEE 802.11 Frequency Hopping Spread Spectrum (FHSS) or Direct Sequence Spread Spectrum (DSSS) radios, for example. Nodes 110, 120, 150 may communicate using the radios over wireless shared media 160. For example, the radios may be arranged to operate using the 2.45 Gigahertz (GHz) Industrial, Scientific and Medical (ISM) band of wireless shared media 160. Other operating bands may be used as well. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may include nodes 110, 120. Nodes 110, 120 may comprise fixed devices having wireless capabilities. A fixed device may comprise a generalized equipment set providing connectivity, management, and control of another device, such as mobile devices. Examples for nodes 110, 120 may include a wireless access point (AP), base station or node B, router, switch, hub, gateway, and so forth. In one embodiment, for example, nodes 110, 120 may comprise access points for a WLAN system. Although some embodiments may be described with nodes 110, 120 implemented as an AP by way of example, it may be appreciated that other embodiments may be implemented using other wireless devices as well.

In one embodiment, AP 110, 120 may also provide access to a network 170 via wired communications media. The network may comprise, for example, a packet network such as the Internet, a corporate or enterprise network, a voice network such as the Public Switched Telephone Network (PSTN), and so forth. The embodiments are not limited in this context.

In one embodiment, system 100 may include node 150. Node 150 may comprise, for example, a mobile device or a fixed device having wireless capabilities. A mobile device may comprise a generalized equipment set providing connectivity to other wireless devices, such as other mobile devices or fixed devices. Examples for node 150 may include a computer, server, workstation, notebook computer, handheld computer, telephone, cellular telephone, personal digital assistant (PDA), combination cellular telephone and PDA, and so forth. In one embodiment, for example, node 150 may comprise a mobile device, such as a mobile station (STA) for a WLAN. In a WLAN implementation, the combination of an AP and associated stations may be referred to as a Basic Service Set (BSS). Although some embodiments may be described with STA 150 implemented as a mobile station for a WLAN by way of example, it may be appreciated that other embodiments may be implemented using other wireless devices as well. For example, node 150 may also be implemented as a fixed device such as a computer, a mobile subscriber station (MSS) for a WMAN, and so forth. The embodiments are not limited in this context.

Nodes 110, 120, 150 may have one or more wireless transceivers and wireless antennas. In one embodiment, for example, nodes 110, 120, 150 may each have multiple transceivers and multiple antennas. The use of multiple antennas may be used to provide a spatial division multiple access (SDMA) system or a multiple-input multiple-output (MIMO) system in accordance with one or more of the IEEE 802.11n proposed standards, for example. The embodiments are not limited in this context.

In general operation, the nodes of system 100 may operate in multiple operating modes. For example, nodes 110, 120, 150 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 160.

In system 100, STA 150 may communicate with various AP, such as AP 110, 120. To communicate with AP 110 or AP 120, STA 150 may first need to associate with a given AP. Once STA 150 is associated with an AP, STA 150 may need to select a data rate for data frames with media and control information over wireless shared media 160. STA 150 may select a data rate once per association, or may periodically select data rates to adapt to transmitting conditions of wireless shared media 160. Adapting data rates to transmitting conditions may sometimes be referred to as rate adaptation operations.

A WLAN such as system 100 may operate at a number of different data rates or data rates. For example, original 802.11 systems using DSSS radios offered only two physical data rates of 1 Megabits per second (Mbps) or 2 Mbps. Current WLAN systems operating in accordance with a number of orthogonal frequency division multiplexing (OFDM) techniques, however, may support a wide range of data rates of up to 54 Mbps or more in the 2.4 GHz region. Other potentially higher data rates and transmit modes may be available as well. Examples of such WLAN systems may include 802.11g and 802.11n systems.

In one embodiment, for example, assume STA 150 and AP 110 attempt to form an association using wireless shared media 160. A data rate for a given communication between STA 150 and AP 110 may vary considerably based on variations in the transmission quality offered by wireless shared media 160. Such variations may occur due to a host of factors such as fading, attenuation, interference from other radiation sources, interference from other 802.11 devices in an ad hoc network, and so forth. These variants may be generally classified as shorter-term modifications to wireless shared media 160 or durable longer-term modifications to the transmission environment. Examples of shorter-term modifications may include STA 150 moving away from AP 110, closing a door between STA 150 and AP 110, moving big objects in the transmission area, and so forth. Examples of longer-term modifications may include STA 150 moving from one office to another office that is closer to AP 110. Moving closer to AP 110 will typically decrease attenuation and will have a longer lasting effect on the energy of the radio signal that will likely decrease the bit error rate (BER) of the signal. This may in turn allow higher application-level throughput since the packet error rate (PER) is lowered, or it may be possible to select a higher rate for transmission.

Some embodiments may select data rates for STA 150 to account for variations in wireless shared media 160. In one embodiment, for example, nodes 110, 120, 150 may each include a component 108. Component 108 may be arranged to select a data rate for a connection between wireless devices based on current transmission conditions for wireless shared media 160. For example, component 108 of STA 150 may comprise a transceiver array, a processor, and memory. The processor may monitor interference levels for STA 150. The interference may be caused by signals received by STA 150 as previously described. The processor may estimate throughput values for each interference level. The processor may estimate and optimize throughput values that would be achieved for each interference level by evaluating the achieved throughput given a data rate that is robust to that level of interference, and given the observation of the amount of time that level of interference is present. The processor may then select a data rate based on the throughput values. In this manner, STA 150 may communicate with AP 110, 120 at a data rate that improves throughput based on current and anticipated interference levels for wireless shared media 160. Component 108 may be described in more detail with reference to FIG. 2.

Figure 2:
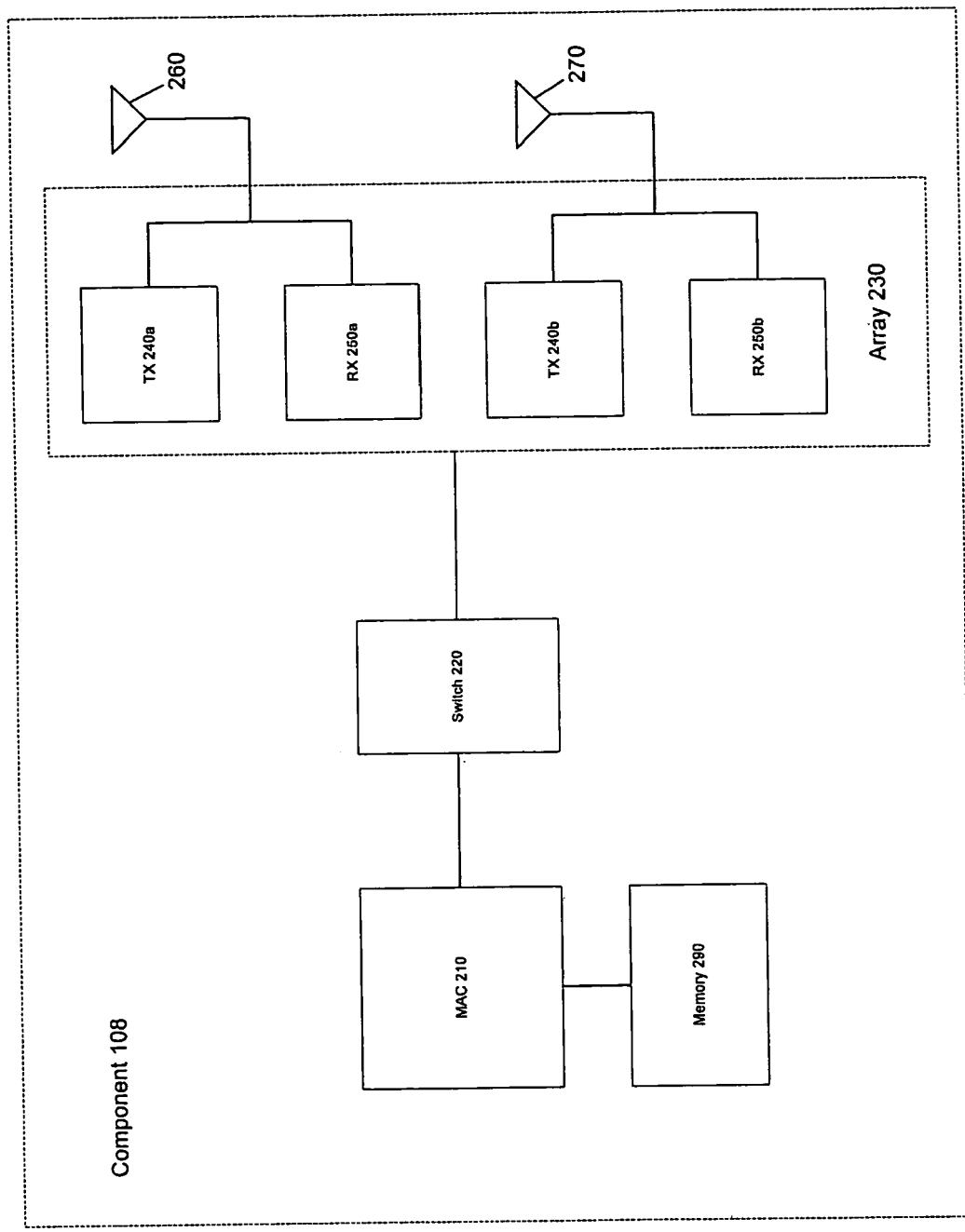
FIG. 2 illustrates one embodiment of a component.

FIG. 2 illustrates one embodiment of a component. FIG. 2 may illustrate a block diagram for component 108 of system 100. Component 108 may be implemented as part of nodes 110, 120 or 150 as described with reference to FIG. 1. As shown in FIG. 2, component 108 may comprise multiple elements, such as processor 210, switch (SW) 220, a transceiver array 230, and a memory 290. Some elements may be implemented using, for example, one or more circuits, components, registers, processors, software subroutines, or any combination thereof. Although FIG. 2 shows a limited number of elements, it can be appreciated that more or less elements may be used in component 108 as desired for a given implementation. The embodiments are not limited in this context.

In one embodiment, component 108 may include a transceiver array 230. Transceiver array 230 may be implemented as, for example, a MIMO system. MIMO system 230 may include two transmitters 240*a* and 240*b*, and two receivers 250*a* and 250*b*. Although MIMO system 230 is shown with a limited number of transmitters and receivers, it may be appreciated that MIMO system 230 may include any desired number of transmitters and receivers. The embodiments are not limited in this context.

In one embodiment, transmitters 240*a-b* and receivers 250*a-b* of MIMO system 230 may be implemented as OFDM transmitters and receivers. Transmitters 240*a-b* and receivers 250*a-b* may communicate data frames with other wireless devices. For example, when implemented as part of AP 110 or AP 120, transmitters 240*a-b* and receivers 250*a-b* may communicate data frames with STA 150. When implemented as part of STA 150, transmitters 240*a-b* and receivers 250*a-b* may communicate data frames with AP 110 or AP 120. The data frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240*a* and receiver 250*a* may be operably coupled to an antenna 260, and transmitter 240*b* and receiver 250*b* may be operably coupled to antenna 270. Examples for antenna 260 and/or antenna 270 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. The embodiments are not limited in this context.

In one embodiment, component 108 may include a processor 210. Processor 210 may be implemented as a general purpose processor. For example, processor 210 may comprise a general purpose processor made by Intel® Corporation, Santa Clara, Calif. Processor 210 may also comprise a dedicated processor, such as a controller, microcontroller, embedded processor, a digital signal processor (DSP), a network processor, an input/output (I/O) processor, a media processor, and so forth. The embodiments are not limited in this context.

In one embodiment, component 108 may include a memory 290. Memory 290 may comprise any machine-readable or computer-readable media capable of storing data, including both volatile and non-volatile memory. For example, the memory may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards. The embodiments are not limited in this context.

In one embodiment, the nodes of system 100 may operate in accordance with one or more of the IEEE 802.11 series of specifications. A wireless device operating in accordance with an IEEE 802.11 specification typically requires the implementation of at least two layers. The first layer is the 802.11 MAC layer. In general, the MAC layer manages and maintains communications between 802.11 devices by coordinating access to a shared radio channel and utilizing protocols to enhance communications over wireless shared media 160. For example, the MAC layer may perform such operations as scanning for 802.11 devices, authenticating 802.11 devices, associating an AP with a STA, performing security techniques such as wireless encryption protocol (WEP), request to send (RTS) and clear to send (CTS) operations to access wireless shared media 160, power saving operations, fragmentation operations, and so forth. The second layer is the 802.11 physical (PHY) layer. The PHY layer may perform the operations of carrier sensing, transmission, and receiving of 802.11 frames. For example, the PHY layer may integrate operations such as modulation, demodulation, encoding, decoding, analog-to-digital conversion, digital-to-analog conversion, filtering, and so forth. The PHY layer is typically implemented using dedicated hardware. The MAC layer, however, is typically implemented using a combination of dedicated hardware and dedicated software.

In one embodiment, for example, processor 210 may be arranged to perform MAC layer operations. For example, processor 210 may be implemented as a media access control (MAC) processor. MAC 210 may be arranged to perform MAC layer processing operations. In addition, MAC 210 may be arranged to select a data rate to communicate media and control information between wireless devices over wireless shared media 160 in accordance with one or more WLAN protocols, such as one or more of the IEEE 802.11n proposed standards, for example. The embodiments, however, are not limited in this context.

When implemented in a node of system 100, component 108 may be arranged to communicate information over wireless communications media between the various nodes, such as AP 110, AP 120, and STA 150. The information may be communicated using in the form of frames, with each frame comprising media information and/or control information. The media and/or control information may be represented using, for example, multiple OFDM symbols. A frame in this context may refer to any discrete set of information, including a unit, packet, cell, segment, fragment, and so forth. The frame may be of any size suitable for a given implementation. Typical WLAN protocols use frames of several hundred bytes, and an 802.11 frame may have a length of up to 1518 bytes or more, for example. The embodiments are not limited in this context.

When implemented as part of STA 150, MAC 210 may be arranged to associate with an AP. For example, MAC 210 may passively scan for access points, such as AP 110, 120. AP 110, 120 may periodically broadcast a beacon. The beacon may contain information about the access point including a service set identifier (SSID), supported data rates, and so forth. MAC 210 may use this information and the received signal strength for each beacon to compare AP and decide upon which one to use. Alternatively, MAC 210 may perform active scanning by broadcasting a probe frame, and receiving probe responses from AP 110, 120. Once an AP has been selected, MAC 210 may perform authentication operations to prove the identity of the selected AP. Authentication operations may be accomplished using authentication request frames and authentication response frames. Once authenticated, STA 150 associates with the selected AP before sending data frames. Association may assist in synchronizing STA 150 and the AP with certain information, such as supported data rates. Association operations may be accomplished using association request frames and association response frames containing elements such as SSID and supported data rates. Once association operations are completed, STA 150 and AP 110 can send data frames to each other, although the embodiments are not limited in this regard.

In some embodiments, MAC 210 may also be arranged to select a data rate to communicate data frames based on current channel conditions for wireless shared media 160. For example, assume STA 150 associates with a peer, such as an AP or other wireless device (e.g., AP 110). STA 150 may be arranged to perform receiver directed rate selection. Consequently, STA 150 may need to select a data rate to communicate data frames between STA 150 and AP 110 prior to communicating the data frames.

In one embodiment, MAC 210 may monitor interference levels for STA 150 to select the appropriate data rate. The interference may be caused by a number of different sources. For example, the interference may be caused by signals received by transceiver array 230 from surrounding radioactive sources, such as an associated BSS (e.g., AP 110), a neighboring BSS (e.g., AP 120), and other wireless devices (e.g., cordless telephones, other mobile stations, and so forth). MAC 210 may estimate throughput values for each interference level. MAC 210 may estimate the throughput values by monitoring interference levels using transceiver array 230. MAC 210 may use the interference information to generate a histogram. The histogram may represent, for example, a number of signal strength values by category and level of interference. The embodiments are not limited in this context.

In one embodiment, MAC 210 may use the information provided by the histogram to assign a probability value to a number of interference levels. The probability value may represent the relative likelihood that a given interference level may be present on wireless shared media 160 during communications by a node. By assigning probability values to each level of interference, MAC 210 may make a more precise estimate of throughput values relative to using absolute assumptions regarding potential interference for the node. The embodiments are not limited in this context.

In one embodiment, MAC 210 may also retrieve a physical layer rate for each measured interference level, such that communications at the given physical layer rate would be reliable in the presence of the corresponding level of interference. For example, MAC 210 may retrieve the appropriate physical layer rate from a table having various predetermined physical layer rates corresponding to certain levels of interference. The embodiments are not limited in this context.

In one embodiment, MAC 210 may estimate a throughput value for each interference level using the probability value and physical layer rate. More particularly, MAC 210 may estimate the throughput value by multiplying the physical layer rate by one minus the probability value to estimate said throughput values. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
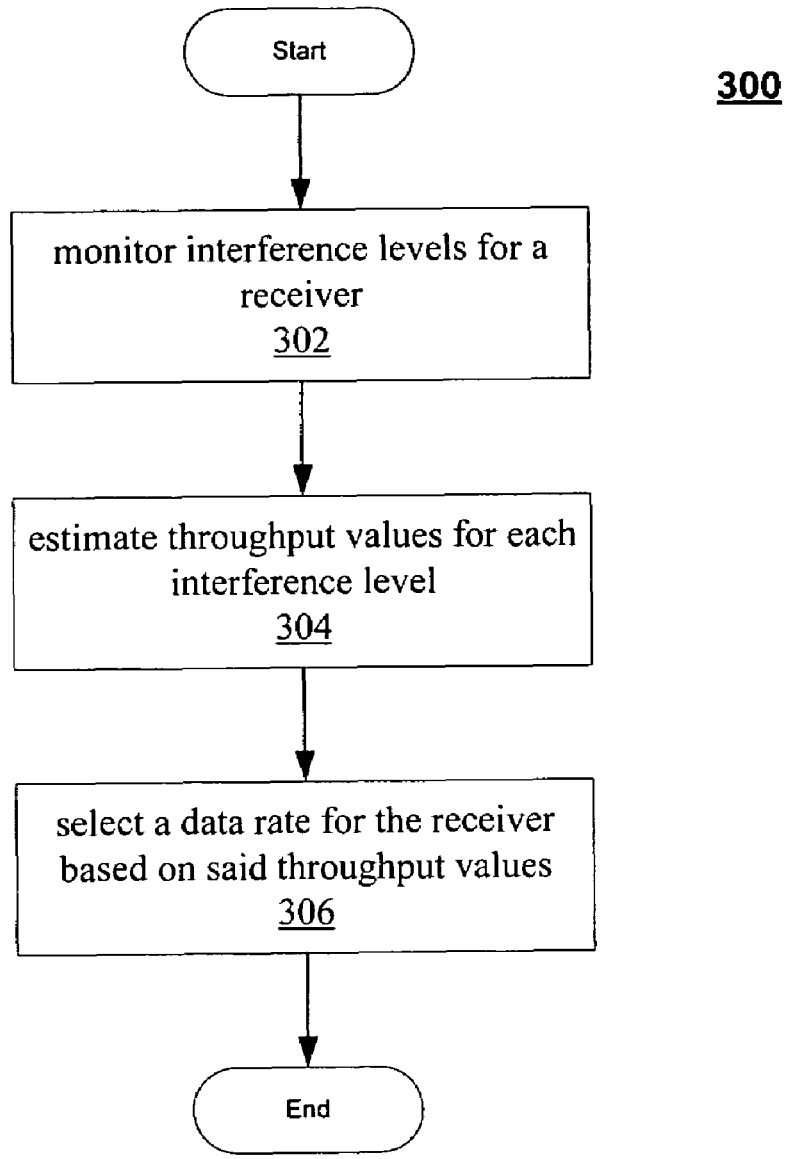
FIG. 3 illustrates one embodiment of a logic flow.

FIG. 3 illustrates one embodiment of a logic flow. FIG. 3 may illustrate a block flow diagram of a logic flow 300. Logic flow 300 may be representative of the operations executed by one or more systems described herein, such as component 108 as implemented as part of nodes 110, 120 or 150, for example. As shown in logic flow 300, interference levels for a receiver may be monitored at block 302. Throughput values for each interference level may be estimated at block 304. A data rate for the receiver may be selected based on the throughput values at block 306. The embodiments are not limited in this context.

In one embodiment, various signals may be received by the receiver. A signal strength value may be recorded for the received signals. The signal strength values may be classified into different categories. A number of interference levels may be defined. A histogram may be generated to represent a number of signal strength values for each category at each level of interference. The embodiments are not limited in this context.

In one embodiment, a probability value may be assigned to each interference level using the histogram. A physical layer rate may be retrieved for each interference level. A throughput value may be estimated for each interference level using the probability value and physical layer rate. For example, the physical layer rate may be multiplied by one minus the probability value to estimate the throughput values. The embodiments are not limited in this context.

In one embodiment, the data rate may be selected in response to a number of different conditions or events. For example, the receiver may receive an explicit or implicit request for a data rate. The receiver may send a response with the data rate to a transmitter that transmitted the request. In another example, the receiver may periodically select a data rate, and send it to a transmitting device on a periodic basis. In yet another example, the receiver may evaluate conditions continuously or periodically, and only inform the transmitting device when a change of data rate is necessary. This may be accomplished by, for example, continuously or periodically updating the estimated throughput values, and sending a new data rate to the transmitter when the change in estimated throughput values exceeds a determined threshold. The embodiments are not limited in this context.

The operation of the above described systems and associated programming logic may be better understood by way of example. Assume STA 150 associates with AP 110. Prior to sending data frames, STA 150 may need to select a data rate based on estimated throughput values for measured interference levels. The throughput for a given data rate may vary considerably depending on the current channel conditions for wireless shared media 160. In addition to receiving signals from AP 110, STA 150 may also receive a number of other signals from various wireless devices using wireless shared media 160. For example, transceiver array 230 of STA 150 may receive signals from AP 120 if STA 150 is within communication range of AP 120. Transceiver array 230 may also receive signals from other radiation sources, such as cordless telephones, cellular telephones, other 802.11 devices, and so forth. Moreover, the interference may change on a relatively frequent basis. Therefore, the performance of STA 150 may vary considerably due to constantly changing interference levels.

To compensate for the varying interference levels, STA 150 may monitor interference using transceiver array 230. MAC 210 may record signal strength values for the received signals. The signal strength value may represent a number of different measurements. For example, the signal strength value may represent the signals received on a per frame basis. In another example, the signal strength value may represent signals measured over a certain defined time interval. MAC processor 210 may record the signal strength values in a data structure in memory 290. The particular signal strength value may comprise any consistent metric. For example, the signal strength value may represent a maximum signal strength over the frame or defined time interval, a median signal strength over the frame or defined time interval, a minimum signal strength over the frame or defined time interval, and so forth. The embodiments are not limited in this context.

In one embodiment, MAC 210 may classify the signal strength values into different categories. Any number of categories may be defined as desired for a given implementation. In one embodiment, for example, each frame may be broadly classified into frames from an associated BSS (e.g., AP 110), frames from a neighboring BSS (e.g., AP 120), and unknown sources (e.g., signals from other interference sources). The embodiments are not limited in this context.

MAC 210 may use the signal strength values to generate a histogram. The histogram may represent a number of signal strength values for each category at each level of interference measured over some period of time. An example of a histogram may be shown in FIG. 4. The embodiments, however, are not limited to this example.

Figure 4:
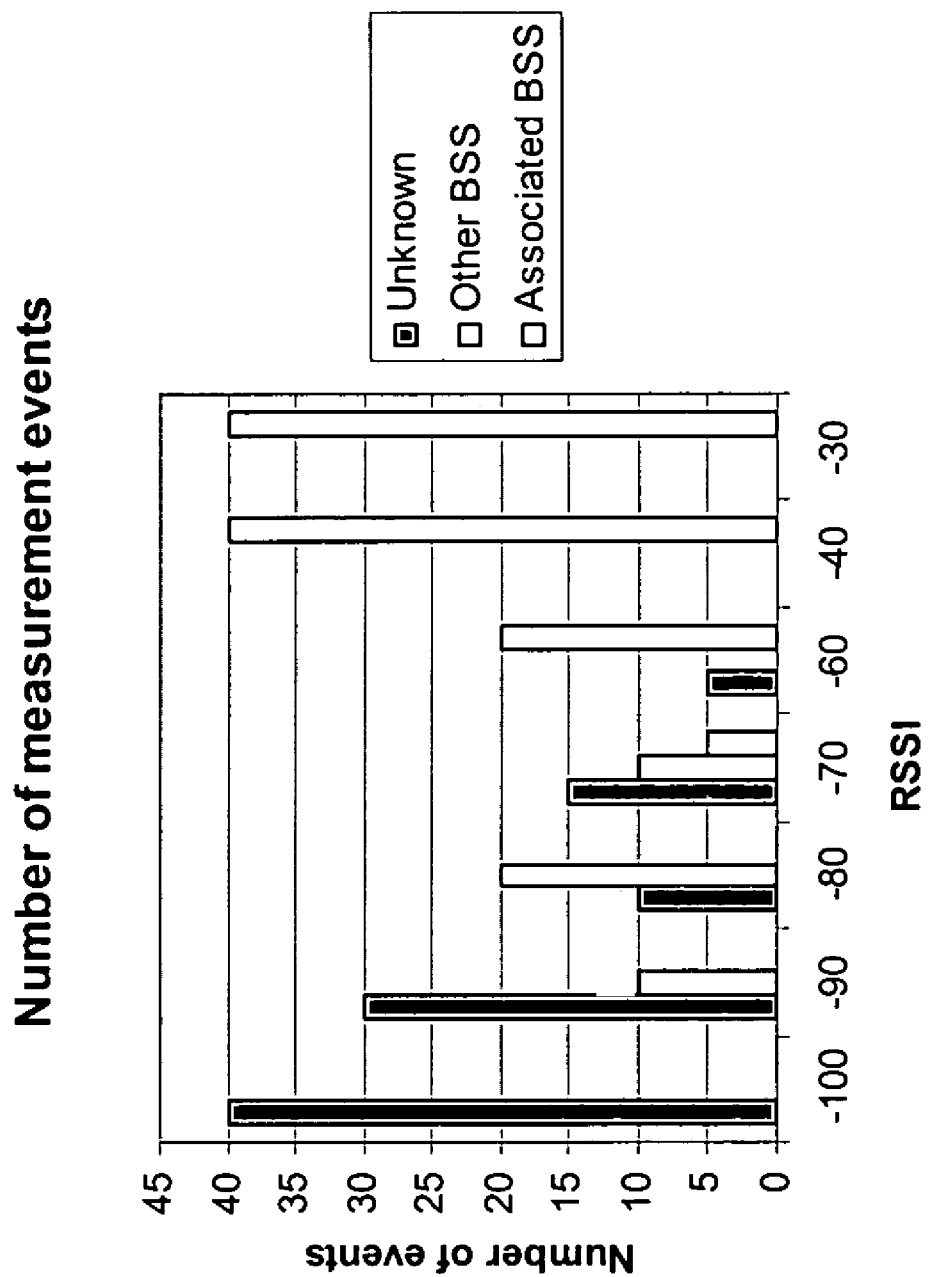
FIG. 4 illustrates one embodiment of a histogram.

FIG. 4 illustrates one embodiment of a histogram. FIG. 4 illustrates a diagram of a histogram 400. Histogram 400 may illustrate an example of a histogram suitable for use by MAC 210 of STA 150. Histogram 400 may comprise a number of measured events ranging from 0 to 50 on a vertical axis. A measured event may represent, for example, a received frame or time interval. Histogram 400 may further comprise a number of received signal strength indications (RSSI) ranging from −100 to −30 dBm on the horizontal axis.

Histogram 400 may also include three categories grouped together for various levels of RSSI. The first category represents the number of events from unknown sources (e.g., various radio devices). The second category represents the number of events from a neighboring BSS (e.g., AP 120). The third category represents the number of events from an associated BSS (e.g., AP 110). At a first extreme end, histogram 400 illustrates that 40 measured events are recorded at an RSSI of −100 dBm, and that no measured events are shown for AP 110, 120. At a second extreme end, histogram 400 illustrates that 40 measured events are recorded at an RSSI of −30 dBm, and that no measured events are shown for AP 120 and the unknown sources. Between the extreme ends each category may comprise multiple measured events, with the category for unknown sources increasing when moving towards the first extreme end, and the category for associated BSS increasing when moving towards the second extreme end.

In one embodiment, MAC 210 may use histogram 400 to set a number of receiver parameters. For example, MAC 210 may use histogram 400 to determine a receiver threshold to receive signals from its own associated BSS. In this example, MAC 210 may set the receiver threshold to −75 dBm to ensure it receives all the signals from AP 110. The particular algorithm used to select the receiver threshold may vary for a desired implementation, and the embodiments are not limited in this context.

In one embodiment, MAC 210 may also use histogram 400 to assign probability values to each interference level. The probability value may represent the relative likelihood that a given interference level may be present on wireless shared media 160 during communications by STA 150. By assigning probability values to each level of interference, a more precise estimate of throughput values may be gained relative to using absolute assumptions regarding potential interference for STA 150.

In one embodiment, for example, MAC 210 may select a data rate based on an assumed level of interference to increase throughput for STA 150. Assume that STA 150 receives an 802.11 frame from AP 110 with a signal power of −60 dBm. Further assume that the observed interference level indicated by histogram 400 is −100 dBm. MAC 210 may select a higher data rate based on an anticipated signal to noise and interference ratio (SNIR) of 40 dB by assuming that the interference level of −100 dBm will remain constant throughout communication of the data frames. The selected data rate, however, may change if the underlying assumption of a particular level of interference changes. For example, MAC 210 may select a lower data rate based on an anticipated SNIR of 10 dB assuming that the interference level is −70 dBm rather than −100 dBm. Both assumptions, however, may represent extremes and therefore may not be as desirable for some implementations.

Alternatively, MAC 210 may use a data rate selection algorithm that considers the probability of an interference event occurring and the corresponding effect it may have on throughput. MAC 210 may determine a probability value for each level of interference using histogram 400. MAC 210 may retrieve a physical layer rate for each interference level. MAC 210 may estimate a throughput value for each interference level using the probability value and physical layer rate. For example, MAC 210 may multiply the physical layer rate by one minus the probability value to estimate the throughput values. Examples for these values may be shown in Table 1 as follows:

TABLE 1

| Interference Level | Probability Value | Physical Layer Rate | Throughput Value |
|---|---|---|---|
| −100 | 60% | 200 Mbps | 80 Mbps |
| −90 | 30% | 120 Mbps | 84 Mbps |
| −80 | 20% | 24 Mbps | 20 Mbps |
| −70 | 5% | 6 Mbps | 5 Mbps |

Table 1 may represent data partially derived using histogram 400. Table 1 may comprise a column for interference levels, a column for probability values, a column for physical layer rates, and a column for throughput values. As shown in Table 1, for example, an interference level of −100 dBm may have an associated physical layer rate of 200 Mbps. The physical layer rate for each interference level may be derived from a number of known sources. The interference level of −100 dBm may have an associated probability value of 60%. MAC 210 may estimate a throughput value by multiplying the physical layer rate of 200 Mbps by one minus the probability value of 60% to arrive at a throughput value of 80 Mbps (e.g., 200 Mbps*(1−0.60)=80 Mbps).

In one embodiment, MAC 210 may calculate the probability value using the data collected in histogram 400. For example, the probability value of 60% for the interference level of −100 dBm may represent the relative likelihood that a level of interference for wireless shared media 160 may be greater than −100 dBm. The probability value of 60% may be derived by summing the 30 recorded events for −90 dBm, the 10 recorded events for −80 dBm, the 15 recorded events for −70 dBm, and the 5 recorded events for −60 dBm (60 events), and dividing the summed result by the total number of events recorded (e.g., 100 events), to arrive at a probability value of 60% (e.g., 60/100=60%). Alternative to this count based technique, it may be possible to derive a probability value based on proportion of time spent at each level. This may be calculated by summing event times event duration divided by the measurement interval. The embodiments are not limited in this context.

Once MAC 210 estimates the throughput values for each interference level, MAC 210 may select a data rate for STA 150 based on the throughput values. For example, MAC 210 may select a data rate of 120 Mbps corresponding to an interference level of −90 dBm since it provides a throughput value of 84 Mbps, which is the highest throughput value for all the interference levels given in Table 1. At the selected interference level of −90 dBm, MAC 210 may anticipate a PER of approximately 25%.

The rate selection algorithm used by MAC 210 assumes that an interference level greater than the selected threshold causes 100% packet loss, and an interference event equal to or lower than the selected threshold causes no packet loss. A more precise assumption may be derived by summing the probability of packet loss for each selected physical layer rate (e.g., using a PER versus SNIR curve) across the probability distribution of interference events, excluding those from an associated BSS, up to the receive threshold. The embodiments are not limited in this context.

MAC 210 may select a data rate in response to a number of different conditions or events. For example, the receiver may receive an explicit or implicit request for a data rate. The receiver may send a response with the data rate to a transmitter that transmitted the request. In another example, the receiver may periodically select a data rate, and send it to a transmitting device on a periodic basis. In yet another example, the receiver may evaluate conditions for wireless shared media 160 continuously or periodically, and only inform the transmitting device when a change of data rate is necessary. The embodiments are not limited in this context.

In one embodiment, communication selection operations may be implemented using a pair of frames similar in structure and use as RTS/CTS frames. The first new frame may be referred to as an initiator aggregation control (IAC). The IAC frame may be used by an AP to initiate receiver directed rate selection operations in a STA. The second new frame may be referred to as a responder aggregation control (RAC). The RAC frame may be used by a STA to communicate a selected data rate to the AP sending the IAC frame. It is worthy to note that the selected data rate may comprise a selected modulation order, coding rate number of spatial streams, and any other transmit parameters that affect the resulting rate. The embodiments are not limited in this context.

In one embodiment, for example, AP 110 may send an IAC frame to STA 150. STA 150 may receive the IAC frame, and select a data rate for transceiver 230. STA 150 may send an RAC frame in response to the IAC frame. The RAC frame may include a field and defined parameter to represent the data rate selected by STA 150. The embodiments are not limited in this context.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radio-telephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, FHSS or DSSS OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising a media access control processor to monitor interference levels for a receiver, assign a probability value to each interference level, retrieve a physical layer rate for each monitored interference level, estimate throughput values for each of said interference levels using said probability value and physical layer rate, and select a data rate based on said throughput values.

2. The apparatus of claim 1, said media access control processor to comprise part of said receiver, and said receiver to comprise part of a mobile device.

3. The apparatus of claim 1, said media access control processor to generate a histogram to represent a number of signal strength values by category and level of interference.

4. The apparatus of claim 3, said media access control processor to assign said probability value to each interference level using said histogram.

5. The apparatus of claim 1, said media access control processor to multiply said physical layer rate by one minus the probability value to estimate said throughput values.

6. A system, comprising:
an antenna; and
a receiver to couple to said antenna, said receiver to include a media access control processor to monitor interference levels for a receiver, assign a probability value to each interference level, retrieve a physical layer rate for each monitored interference level, estimate throughput values for each of said interference levels using said probability value and physical layer rate, and select a data rate based on said throughput values.

7. The system of claim 6, said receiver to comprise part of a mobile device.

8. The system of claim 6, said media access control processor to generate a histogram to represent a number of signal strength values by category and level of interference.

9. The system of claim 8, said media access control processor to assign said a probability value to each interference level using said histogram.

10. The system of claim 6, said media access control processor to multiply said physical layer rate by one minus the probability value to estimate said throughput values.

11. A method, comprising:
monitoring interference levels for a receiver;
assigning a probability value to each interference level;
retrieving a physical layer rate for each monitored interference level;
estimating throughput values for each of said interference levels using said probability value and physical layer rate; and
selecting a data rate for said receiver based on said throughput values.

12. The method of claim 11, comprising:
receiving signals at said receiver;
recording a signal strength value for said received signals;
classifying said signal strength values into categories;
defining said levels of interference; and
generating a histogram to represent a number of signal strength values for each category at each level of interference.

13. The method of claim 12, comprising:
assigning said probability value to each interference level using said histogram.

14. The method of claim 11 comprising multiplying said physical layer rate by one minus the probability value to estimate said throughput values.

15. The method of claim 11, comprising:
receiving a request for a data rate at said receiver; and
sending a response with said data rate to a transmitter.

16. The method of claim 11, comprising sending said data rate to a transmitter on a periodic basis.

17. The method of claim 11, comprising sending said data rate to a transmitter in response to changes in said estimated throughput values.

18. An article comprising a machine-readable storage medium containing instructions that if executed enable a system to monitor interference levels for a receiver, assign a probability value to each interference level, retrieve a physical layer rate for each monitored interference level, estimate throughput values for each interference level using said probability value and physical layer rate, and select a data rate for said receiver based on said throughput values.

19. The article of claim 18, further comprising instructions that if executed enable the system to receive signals at said receiver, record a signal strength value for said received signals, classify said signal strength values into categories, define said levels of interference, and generate a histogram to represent a number of signal strength values for each category at each level of interference.

20. The article of claim 19, further comprising instructions that if executed enable the system to assign said probability value to each interference level using said histogram.

21. The article of claim 18, further comprising instructions that if executed enable the system to multiply said physical layer rate by one minus the probability value to estimate said throughput values.

* * * * *